United States Patent [19]

Carlson

[11] Patent Number: 5,323,649

[45] Date of Patent: Jun. 28, 1994

[54] AIRPORT WIND DIRECTION AND VELOCITY INDICATOR

[76] Inventor: Carl H. Carlson, HC 32, Box 2540, Rangeley, Me. 04970

[21] Appl. No.: 5,460

[22] Filed: Jan. 19, 1993

[51] Int. Cl.$^5$ .............................................. G01F 1/00
[52] U.S. Cl. ............................ 73/170.07; 73/170.06; 73/170.05; 340/949
[58] Field of Search ........... 73/170.05, 170.06, 170.07, 73/170.08; 340/947–950, 968; 116/273, 274, 284, 286–288, 264, 173

[56] References Cited

U.S. PATENT DOCUMENTS

| | | | |
|---|---|---|---|
| 1,475,075 | 11/1923 | Macy | 340/949 |
| 1,911,169 | 5/1933 | Trogner | 73/170.07 |
| 2,017,224 | 10/1935 | Wilhelm | 73/170.05 |
| 2,040,305 | 5/1936 | Graham | 73/170.06 |
| 2,043,847 | 6/1936 | Wilhelm | 73/170.05 |
| 3,537,310 | 11/1970 | Barrett | 73/170.06 |
| 4,093,937 | 6/1978 | Habinger | 340/949 |
| 4,201,973 | 5/1980 | Jackson et al. | 73/170.06 |
| 4,241,604 | 12/1980 | Hergenrother | 340/949 X |
| 4,481,505 | 11/1984 | Thompson | 340/949 |
| 4,486,754 | 12/1984 | Guggemos | 340/949 |
| 4,553,430 | 11/1985 | Behrens | 73/170.06 |
| 4,627,278 | 12/1986 | Soto | 73/170.06 |
| 4,812,844 | 3/1989 | Kalltrom | 73/170.06 X |
| 5,105,191 | 4/1992 | Keedy | 340/949 X |

FOREIGN PATENT DOCUMENTS 0639413  12/1936  Fed. Rep. of Germany ...... 340/946

Primary Examiner—Richard E. Chilcot, Jr.
Assistant Examiner—Elizabeth L. Dougherty
Attorney, Agent, or Firm—William Nitkin

[57] ABSTRACT

A tetrahedron-shaped airport wind direction and velocity indicator being triangular in cross-section with first and second sides sloping downward from a top edge, such sides coming to a point at the front of the device with the device adapted to point into the wind. The device has illuminable numerical indicia for displaying wind speed on its first and second sides and illuminable side edges for night time viewing of the device from above with the direction of the device indicating wind direction.

5 Claims, 2 Drawing Sheets

AIRPORT WIND DIRECTION AND VELOCITY INDICATOR

BACKGROUND OF THE INVENTION

1. Field of the Invention

This invention resides in the area of airport wind direction and velocity indicators and more particularly relates to a tetrahedron-shaped wind detector visually displaying wind velocity thereon for pilots of aircraft to view such readings from the sky.

2. Description of the Prior Art

There are many small airports which lack control towers to provide wind direction and wind speed information to pilots wishing to land their aircraft. Some of these small airports use wind socks which are made of cloth or plastic and which are blown in the direction of the oncoming wind. When a pilot views such wind sock from above the landing strip, he can tell the direction of the wind at the level of the runway. Of course, at night such wind socks are not easily visible. Some airfields provide landing lights which can be activated by a radio signal directed to them from small aircraft so that the landing field will become illuminated at night.

The problems of landing aircraft at small airfields have been appreciated by the prior art such as U.S. Pat. No. 4,201,973 to Jackson for an Airport Landing Indicator Apparatus which discloses an apparatus for indicating wind direction and wind velocity by means of illuminated arrows at both ends of a runway with a lighted sequence to indicate air speed.

SUMMARY OF THE INVENTION

It is an object of this invention to provide an improved airport wind direction indicator and wind speed indicator from those disclosed in the prior art. To this end an illuminated tetrahedron-shaped member, hereinafter referred to as the tetrahedron, is rotatably disposed adjacent to a runway. The tetrahedron because of its shape points into the wind and has lights disposed around its perimeter. On two sides of the tetrahedron are large illuminated digital numbers which receive and display indicia indicating the wind speed obtained from an anemometer mounted on the front of the tetrahedron. Lights are also disposed at the perimeters of the sides of the tetrahedron so that the tetrahedron is illuminated at night and its pointed shape can be seen by pilots. A radio signal from the aircraft would not only activate the runway lights, but would also activate the lights on the tetrahedron which would then indicate the wind direction by the direction of its shape or the configuration of its lights pointing into the wind direction. By observing the large digital readout lights on the sides of the tetrahedron from above, the pilot can also easily discern the wind velocity being a numerical display as determined by the anemometer.

DESCRIPTION OF THE PREFERRED EMBODIMENT(S)

Figure 1:
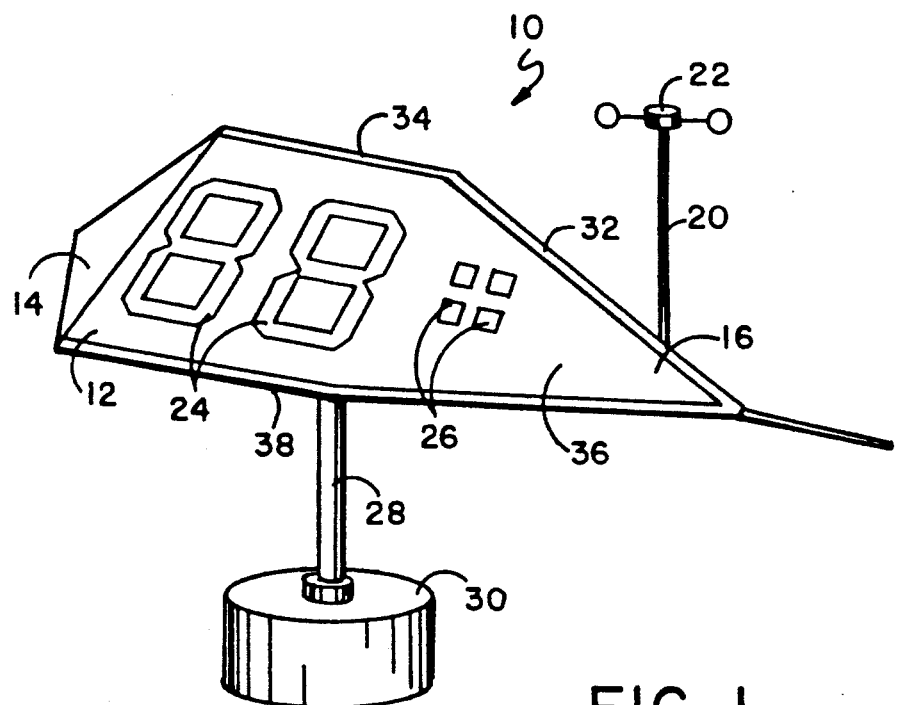
FIG. 1 illustrates a perspective view of the device of this invention.
Figure 4:
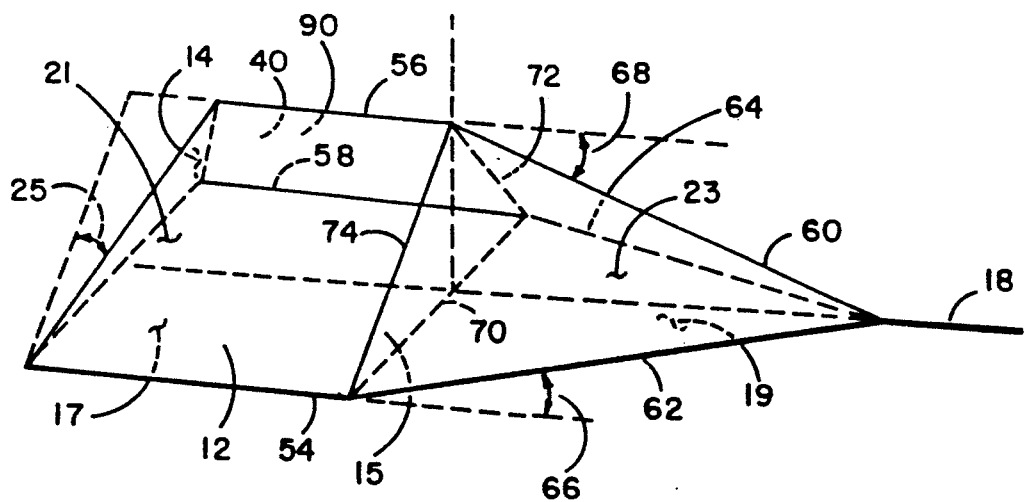
FIG. 4 illustrates a perspective transparent view of tetrahedron showing the shapes of the sides thereof.

FIG. 1 illustrates a perspective view of the airport wind direction and velocity indicator of this invention which consists of a tetrahedron-shaped, substantially hollow member which is triangular in cross-section and which has three sides and an end member, the sides coming together to form a point at the front. FIG. 4 illustrates a transparent view of the shape of the tetrahedron member which shows rear side 14, right side 12, left side 40 and bottom side 15. Bottom side 15 includes rear portion 17 which is generally rectangular up to dotted line 70 wherein front portion 19 of bottom side 15 is triangular and rises upwards with its sides coming to a point at the front of the device. The shape of the other two sides 12 and 40 are also similar except that the rear of right and left sides 12 and 40 are slanted so that triangular rear side 14 is disposed at an angle 25 from a horizontal. Right side 12 includes rear portion 21 and front portion 23 where edges 54 and 56 of rear portion 21 are generally parallel, and edges 60 and 62 of front portion 23 come together to form a point. Left side 40 has a similar configuration as right side 12. Rear portion 21 of right side 12 is joined along edge 54 to rear portion 17 of bottom side 15. Similarly, rear portion 90 of left side 40 is joined along edge 58 at the other side of rear portion 17 of bottom side 15. The front portion 23 of right side 12, being generally triangular-shaped, is a continuation of rear portion 21 of right side 12 and is joined along edge 62 to the front portion 19 of bottom side 15. In a like fashion left side 40 has its rear portion 90 joined along edge 58 to rear portion 17 of bottom side 15. As left side 40 extends beyond dotted line 72, it is joined along edge 64 at an angle to front portion 19 of bottom side 15. This configuration causes bottom side 15 to move upward at dotted line 70 at angle 66 of approximately 15 degrees. Edge 60 at the front of the device where sides 12 and 40 come together slants downward at angle 68 at approximately 20 degrees from the horizontal disposed along edge 56. Thus a totally enclosed tetrahedron-shaped structure is produced which, since it is hollow, lightweight and rotatably mounted, will always move into the wind. The device can be made of a lightweight metal such as sheet aluminum and the like. An anemometer 22 can be mounted on a shaft 20 along top edge 60, as seen in FIG. 1, which anemometer spins in the wind to determine the wind speed.

Figure 2:
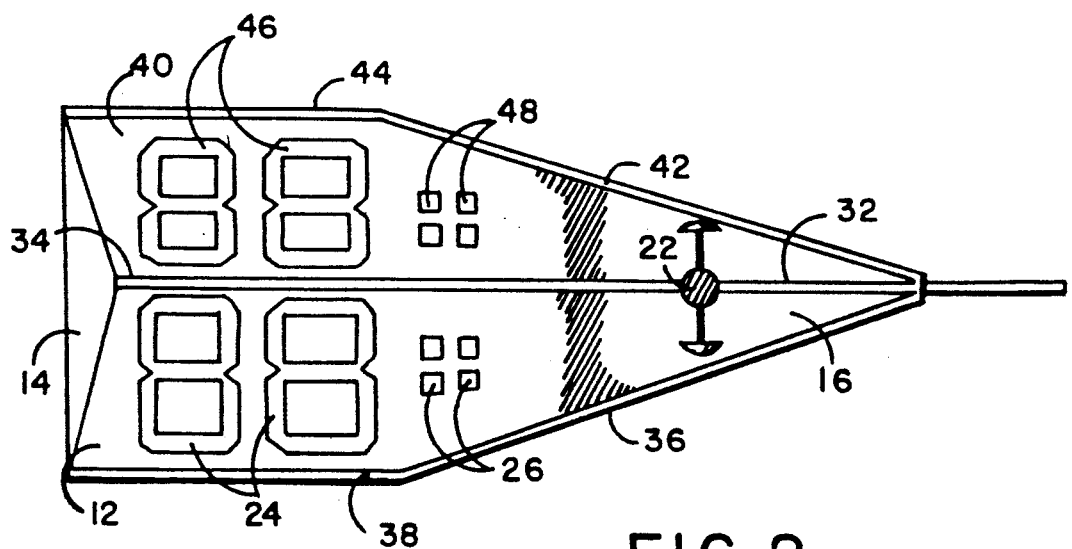
FIG. 2 illustrates a top view of the device of this invention.

As seen in FIG. 2 along edges 54, 56, 58 and edges 60, 62, 64 can be disposed strip light members such as 38, 34, 44 and 32, 36, 42, respectively, to be illuminated at night to outline the pointed direction of the tetrahedron shaped device 10 of this invention. At the front of the device can be disposed pointer member 18 which also can have a strip light thereon.

Device 10 of this invention rotates on post 28 which can be mounted rotatably on support member 30 which can be buried in the ground and be of sufficient weight and strength to support device 10.

Within the device can be circuitry connected to a power source not illustrated but well known in the art, which allows the spinning movement of the anemometer 22 to cause a directed electric current to illuminate selected of numbers 24 and 46 disposed respectively on right side 12 and left side 40 of the device as seen in FIGS. 1 and 2. Illuminatable digital numbers 24 and 46 can display any number from zero to ninety-nine which numbers will be illuminated along with the side strip lights 32, 34, 36, 38, 42 and 44. When a pilot by radio signal illuminates the runway lights and the device of this invention, he can observe from the strip lights on the side edges of the device the direction they are pointing into the wind and then observe on either slanted side of the device the wind speed indicia displayed by the illuminated indicia on the side of the tetrahedron.

FIG. 2 illustrates a top view of the substantially tetrahedron-shaped device of this invention.

Figure 3:
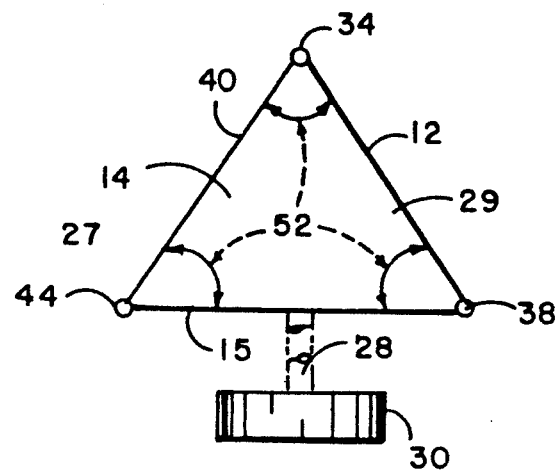
FIG. 3 illustrates a rear view of the device of this invention.

FIG. 3 illustrates a rear view of the triangular cross-sectional shape of the tetrahedron-shaped device of this invention showing right side 12, left side 40 and bottom side 15 joined to one another at angle 52 of approximately 60 degrees at each corner of the triangle.

In a preferred embodiment lighted displays 24 and 46 are more than one foot high on the sides which size is large enough to be easily viewed by a pilot flying in a normal airport traffic pattern. A plurality of block lights 26 and 48 disposed respectively on right side 12 and left side 40 can be activated when the wind speed reaches a predetermined knots-per-hour speed. Block lights 26 and 48 can be separate amber and red flashing lights which would begin flashing at such predetermined wind speeds so that a pilot would know that he should use extra caution in attempting a landing. It should be further noted that the amber/red flashing light system can be provided as the sole wind speed system, and the device can be provided without the illuminated numerals. The strip lights at perimeter edges of the tetrahedron can be fluorescent or other types of strip lights known in the art which at night would outline the tetrahedron making it clearly visible to pilots of planes overhead. Post 28 can be positioned at the center of balance of the device and would allow the illuminated tetrahedron to swing freely therearound to point into the direction of the wind. Electrical power can be provided by an underground cable extending up through the center of post 28 which is not shown in this view but which technology is well known in the prior art.

The device of this invention is a relatively inexpensive device that can be placed at remote airport locations and is far more visible than the prior art wind sock and would also be easier to view than prior art arrow-shaped devices where one has to count a series of small, sequenced lights to determine wind velocity.

Although the present invention has been described with reference to particular embodiments, it will be apparent to those skilled in the art that variations and modifications can be substituted therefor without departing from the principles and spirit of the invention.

I claim:

1. A device for indicating wind direction and speed, comprising:

a structure shaped in the form of a tetrahedron, having a right side, left side and bottom side, said device having a forward portion, a rear portion, a top and a bottom, said device having a triangular cross-section, said device coming to a point at said forward portion, and said right and left sides meeting at the top of said device, said right side and left side joined with one another and with said bottom side to form a plurality of edges, said left and right sides viewable from above said device; a post member; said device rotatably mounted on said post member, to point into the wind by the force of the wind; an anemometer for detecting wind speed mounted on the forward portion of said device; and illuminated numerals displayed on the left and right sides of said device, said numerals indicating the speed of the wind as determined by said anemometer.

2. The device of claim 1 further including a plurality of illuminated strip lights disposed along said edges forming a display of lights, said lights pointing into the direction of the wind when viewed from above to indicate wind direction.

3. The device of claim 1 wherein said numerals are at least one foot high.

4. The device of claim 2 further including a series of flashing warning lights displayed on said device to denote that wind speed has reached a predetermined wind speed level.

5. The device of claim 4 wherein said series of flashing warning lights are displayed on said left and right sides of said device.

* * * * *